United States Patent Office 3,059,994
Patented Oct. 23, 1962

3,059,994
PURIFICATION OF SULFURIC ACID
Alan F. Clifford, Lafayette, Ind., and Randolph Perry, Jr., Brentwood, Mo., assignors to Monsanto Chemical Company, St. Louis, Mo., a corporation of Delaware
No Drawing. Filed May 20, 1958, Ser. No. 736,457
7 Claims. (Cl. 23—172)

This invention relates to improving the quality of concentrated sulfuric acid containing iron impurities.

Depending upon its method of manufacture, handling and shipping methods concentrated sulfuric acid will contain small amounts of dissolved iron impurities which are highly objectionable in many operations requiring its usage, as for example in the preparation of premium grade alum. The exact state of iron as the dissolved contaminant in concentrated sulfuric acid is not known, however, it is generally accepted to be present in ionic form, that is as a salt such as ferric sulfate, ferrous sulfate, ferrous acid sulfate, and the like. While many methods have been proposed and tried for the removal of these iron impurities not one has been found entirely satisfactory either from the standpoint of economics or efficiency or ease or safety of operation or any combination thereof.

In accordance with this invention it has been found that the quality of concentrated sulfuric acid containing iron impurities can be improved in an economic, efficient, convenient and relatively safe manner by the method comprising heating a super-saturated solution of aluminum sulfate in the said impure acid and subsequently separating the solids so formed.

The term "super-saturated solution" as used herein and in the appended claims is employed in its ordinary sense, that is a solution which contains an excess of dissolved substance (in the instant case aluminum sulfate) over the amount normally required for saturation at a particular temperature, in other words the solution contains an abnormal amount of solute.

By the term "concentrated sulfuric acid" as employed herein and in the appended claims is meant sulfuric acid having an $H_2SO_4$ concentration in excess of about 90% by weight.

In the formation of the super-saturated solutions of the process of this invention it is preferred to add aluminum sulfate to the contaminated concentrated sulfuric acid in an amount sufficient to provide a super-saturated solution at the heating temperature. Although the solubility of aluminum sulfate decreases with increase in $H_2SO_4$ content it has been found particularly advantageous that aluminum sulfate be added in the form of an aqueous solution thereof. In that by so doing the acid will be diluted it is preferred that the aluminum sulfate be added in the form of a saturated or substantially saturated aqueous solution thereof, however, aqueous solutions containing as little as 5 parts by weight of aluminum sulfate per 100 parts by weight of water can be employed. In such instances the iron-free sulfuric acid ultimately obtained can be readily concentrated up to the desired amount by incorporating sulfur trioxide therein.

The amount of aluminum sulfate required to provide a super-saturated solution thereof in concentrated sulfuric acid at the heating temperature is very small as evidenced by the following solubility limits in weight percentages at room temperature:

| $H_2SO_4$ content in percent: | $Al_2(SO_4)_3$ [1] solubility limit in percent |
|---|---|
| 93.0 | [2] 0.2 |
| 96.7 | [2] 0.075 |
| 100.0 | [2] 0.02 |

[1] Anhydrous.
[2] Approximately.

To illustrate the small amount required, sufficient 98–99% sulfuric acid having a small amount of iron impurities is mixed at room temperature with an aqueous solution of aluminum sulfate such that the final composition contains approximately 0.1 to 0.2% by weight aluminum sulfate and 97% by weight sulfuric acid. This solution is a super-saturated solution as evidenced by its clarity. Upon heating the said super-saturated solution, as for example at about 100° C. for about one hour, the excess aluminum sulfate precipitates rapidly carrying all of the iron impurities down with it. Upon cooling the mass and filtering through a suitable filter, with or without a suitable filter aid as for example diatomaceous earth, the filtrate which is iron-free and of approximately 97% $H_2SO_4$ content can be used for making premium grade "paper-maker's" alum.

Ordinarily the heating temperature in the process of this invention will be in excess of 50° C. but preferably in the range of about 80° C. to about 135° C. Higher temperatures, however, can be employed if desired as for example up to about 200° C. The time of heating can vary widely depending upon the heating temperature, the amount of iron impurity, the amount and concentration of the sulfuric acid to be treated, the amount of aluminum sulfate in the super-saturated solution at the heating temperature, the particular designs of the chemical operation as well as the available equipment and the like. In general, however, the time of heating decreases with increase in temperature.

As particularly illustrative of the process of this invention but not limitative thereof is the following:

Example I

To a glass-lined jacketed vessel is added an aqueous solution containing 250 pounds of water and 40 pounds of anhydrous aluminum sulfate. Thereto and with agitation is added 19,950 pounds of 98% sulfuric acid containing 9 parts per million of iron. To this clear solution is added 100 pounds of diatomaceous earth. The mass is then heated to about 105° C. and held at 100–110° C. without agitation for about one hour by maintaining steam in the jacket of the vessel. At the end of this heating period all of the excess aluminum sulfate precipitated. The mass is cooled to about 35° C. and filtered through a filter press. The filtrate so obtained is completely free of iron contamination and contain 96.7% by weight $H_2SO_4$ and less than 0.05% by weight aluminum sulfate. This iron-free acid is particularly useful in preparing premium grade alum.

Example II

In contrast to the process of Example I, wherein at a heating temperature of 100–110° C. but one hour was required, employing the same procedure but utilizing a "heating temperature" of 25° C. several days were required to precipitate all of the excess aluminum sulfate and ridding the acid of contaminating iron.

In the process of this invention it has been found when heating the super-saturated solution particularly advantageous to pass or bubble through the heated mass gaseous oxygen or any gaseous mixture of oxygen and an inert gas, e.g., air per se or air in admixture with gaseous oxygen.

Instead of adding aluminum sulfate, such common alums as aluminum-ammonium sulfate, aluminum-sodium sulfate and aluminum-potassium sulfate can also be employed in preparing the super-saturated solution of this invention, which solutions upon heating in accordance with the process of this invention and subsequently removing the solids provide iron-free concentrated sulfuric acid.

In another aspect of this invention aluminum sulfate can be formed in situ, that is an aluminum salt of an inorganic acid which provides aluminum sulfate when in admixture with concentrated sulfuric acid can be employed provided it be used in an amount sufficient to yield a super-saturated solution of aluminum sulfate at the heating temperature. As illustrative of such is aluminum chloride, aluminum nitrate, aluminum phosphate, and the like. As illustrative of this embodiment of this invention but not limitative thereof is the following:

*Example III*

To a glass-lined jacketed vessel is added an aqueous solution containing 1 part by weight of water and 1 part by weight of aluminum chloride (anhydrous basis). Thereto and with agitation is added 100 parts by weight of 98% sulfuric acid containing 36 parts per million of iron. The mass is then heated to about 100° C. and held at 100° C. without agitation for about 1 hour. At the end of this heating period all of the excess of aluminum sulfate precipitated. The mass is cooled to about 30° C. and filtered. The filtrate so obtained is completely free of iron contamination and contains 97% $H_2SO_4$.

While this invention has been described with respect to certain embodiments it is not so limited and it is to be understood that variations and modifications thereof obvious to those skilled in the art can be made without departing from the spirit or scope of this invention.

What is claimed is:

1. The method of removing iron impurities from sulfuric acid to provide an iron-free sulfuric acid which comprises adding an aqueous solution of an aluminum salt to a sulfuric acid having an $H_2SO_4$ concentration in excess of 90% by weight and containing dissolved iron impurities, said aqueous solution of aluminum salt being added in an amount sufficient to provide a supersaturated solution of aluminum salt in said sulfuric acid, heating the resulting supersaturated solution until excess aluminum salt precipitates from said acid thereby forming an aluminum salt precipitate containing all of said iron impurities and subsequently separating said precipitate from the iron-free sulfuric acid so formed.

2. The method of removing iron impurities from sulfuric acid to provide an iron-free sulfuric acid, which comprises heating a supersaturated solution of aluminum sulfate in a sulfuric acid having an $H_2SO_4$ concentration in excess of 90% by weight and containing small amounts of dissolved iron impurities, at a temperature in the range of about 80° C. to 135° C. until excess aluminum sulfate precipitates from said acid, thereby forming an aluminum sulfate precipitate containing all of said iron impurities, and subsequently separating said precipitate from the iron-free sulfuric acid so formed.

3. The method of removing iron impurities from sulfuric acid to provide an iron-free sulfuric acid which comprises adding an aqueous solution of aluminum sulfate to a sulfuric acid having an $H_2SO_4$ content of 98% by weight and containing from 9 to 36 parts per million of iron impurities dissolved therein, said aqueous solution of aluminum sulfate being added in an amount sufficient to provide a supersaturated solution of aluminum sulfate in said sulfuric acid, mixing said aqueous solution and said acid, heating the resultant mixture at a temperature in the range of from about 80° C. to 135° C. until excess aluminum sulfate precipitates from said supersaturated solution, thereby forming an aluminum sulfate precipitate containing all of said iron impurities, and subsequently separating said precipitate from the iron-free sulfuric acid so formed.

4. The method of claim 1 wherein the super-saturated solution is heated at a temperature in excess of about 50° C.

5. The method of claim 1 wherein during the heating operation gaseous oxygen is bubbled through the supersaturated solution.

6. The method of claim 1 wherein the aluminum salt is aluminum chloride.

7. The method of claim 1 wherein the aluminum salt is aluminum sulfate.

References Cited in the file of this patent

UNITED STATES PATENTS

| | | |
|---|---|---|
| 2,192,687 | McCleary | Mar. 5, 1940 |
| 2,344,429 | Gelder | Mar. 14, 1944 |
| 2,739,040 | Mancke | Mar. 20, 1956 |
| 2,864,670 | Walwark | Dec. 16, 1958 |